(12) United States Patent
Garabini et al.

(10) Patent No.: US 11,926,061 B2
(45) Date of Patent: Mar. 12, 2024

(54) LOGISTIC DEVICE

(71) Applicant: UNIVERSITA' DI PISA, Pisa (IT)

(72) Inventors: Manolo Garabini, Bolano (IT); Danilo Caporale, Milan (IT); Alessandro Settimi, Pisa (IT); Lucia Pallottino, Pisa (IT); Manuel Giuseppe Catalano, Pisa (IT); Giorgio Grioli, Pisa (IT); Vinicio Tincani, Lucca (IT); Antonio Bicchi, Massa (IT)

(73) Assignee: UNIVERSITA' DI PISA, Pisa (IT)

( * ) Notice: Subject to any disclaimer, the term of this patent is extended or adjusted under 35 U.S.C. 154(b) by 311 days.

(21) Appl. No.: 17/606,773

(22) PCT Filed: Apr. 29, 2020

(86) PCT No.: PCT/IB2020/054032
§ 371 (c)(1),
(2) Date: Oct. 27, 2021

(87) PCT Pub. No.: WO2020/222135
PCT Pub. Date: Nov. 5, 2020

(65) Prior Publication Data
US 2022/0203542 A1    Jun. 30, 2022

(30) Foreign Application Priority Data

Apr. 30, 2019   (IT) .................... 102019000006474

(51) Int. Cl.
*B25J 13/08*         (2006.01)
*B25J 5/00*          (2006.01)
(Continued)

(52) U.S. Cl.
CPC ............ *B25J 9/1682* (2013.01); *B25J 5/007* (2013.01); *B25J 9/0087* (2013.01); *B25J 9/0093* (2013.01); *B25J 13/08* (2013.01); *B25J 13/085* (2013.01); *B25J 15/0009* (2013.01); *B25J 15/0014* (2013.01); *B65G 47/907* (2013.01); *B65G 61/00* (2013.01)

(58) Field of Classification Search
CPC ...... B65G 47/907; B65G 61/00; B25J 9/1682; B25J 9/0087; B25J 5/007; B25J 13/085;
(Continued)

(56) References Cited

U.S. PATENT DOCUMENTS 9,592,604 B2 * 3/2017 Hoffman ................ B25J 13/025
9,592,759 B1   3/2017 Gilbertson et al.
(Continued)

FOREIGN PATENT DOCUMENTS

EP           3144255 A1    3/2017
WO        2015147725 A1   10/2015
(Continued)

OTHER PUBLICATIONS

Kok et al., Design and Evaluation of an Underactuated Adaptive Finger for Parallel Grippers, 2018, IEEE, p. 1615-1620 (Year: 2018).*
(Continued)

*Primary Examiner* — McDieunel Marc
(74) *Attorney, Agent, or Firm* — Vorys, Sater, Seymour and Pease LLP

(57) ABSTRACT

Logistic device, for handling a package being collected that defines a contact surface with items not being collected, including a first robotic arm including adaptive gripper having at least three degrees of freedom to modify adaptive gripper position and spatial orientation; a second robotic arm including an end effector defining a resting surface and three degrees of freedom to modify end effector position and spatial orientation; control unit to command the first robotic arm to contact the adaptive gripper and package, to deform the adaptive gripper according to adhesion surface between the package and move the package from a storage position wherein the contact surface contacts the items and a collection position wherein the contact surface does not contact (Continued)

the items; the second robotic arm bringing the end effector resting surface into contact with the contact surface; and then the second robotic arm to move the package.

14 Claims, 6 Drawing Sheets

(51) Int. Cl.
    *B25J 9/00*         (2006.01)
    *B25J 9/16*         (2006.01)
    *B25J 15/00*       (2006.01)
    *B65G 47/90*      (2006.01)
    *B65G 61/00*      (2006.01)

(58) Field of Classification Search
    CPC ...... B25J 13/08; B25J 15/0014; B25J 9/0093; B25J 15/0009
    See application file for complete search history.

(56) References Cited

U.S. PATENT DOCUMENTS

| | | | | |
|---|---|---|---|---|
| 9,802,317 | B1 * | 10/2017 | Watts | G05B 19/402 |
| 9,827,677 | B1 * | 11/2017 | Gilbertson | B25J 9/046 |
| 9,827,678 | B1 * | 11/2017 | Gilbertson | A47L 11/4055 |
| 9,886,035 | B1 * | 2/2018 | Watts | G06V 20/58 |
| 9,926,138 | B1 * | 3/2018 | Brazeau | B25J 5/007 |
| 9,938,092 | B2 * | 4/2018 | McMurrough | B25J 9/0093 |

FOREIGN PATENT DOCUMENTS

| | | |
|---|---|---|
| WO | 2017077429 A1 | 5/2017 |
| WO | 2017199127 A1 | 11/2017 |

OTHER PUBLICATIONS

Elliot et al., Making objects graspable in confined environments through push and pull manipulation with a tool, 2016, IEEE, p. 4851-4858 (Year: 2016).*

Fernandez et al., Bio-inspired Robotic Handling of Heterogeneous Logistics Goods, 2007, IEEE, p. 192-197 (Year: 2007).*

Agarwal et al., Measurement of shear forces during gripping tasks with a low-cost tactile sensing system, 2019, IEEE, 330-336 (Year: 2019).*

International Search Report and Written Opinion dated Aug. 14, 2020, for PCT/IB2020/054032 to Universita' Di Pisa filed Apr. 29, 2020.

Search Report and Written Opinion dated Feb. 13, 2020, for 10201900006474 to Universita' Di Pisa, et al. iled Apr. 30, 2020.

* cited by examiner

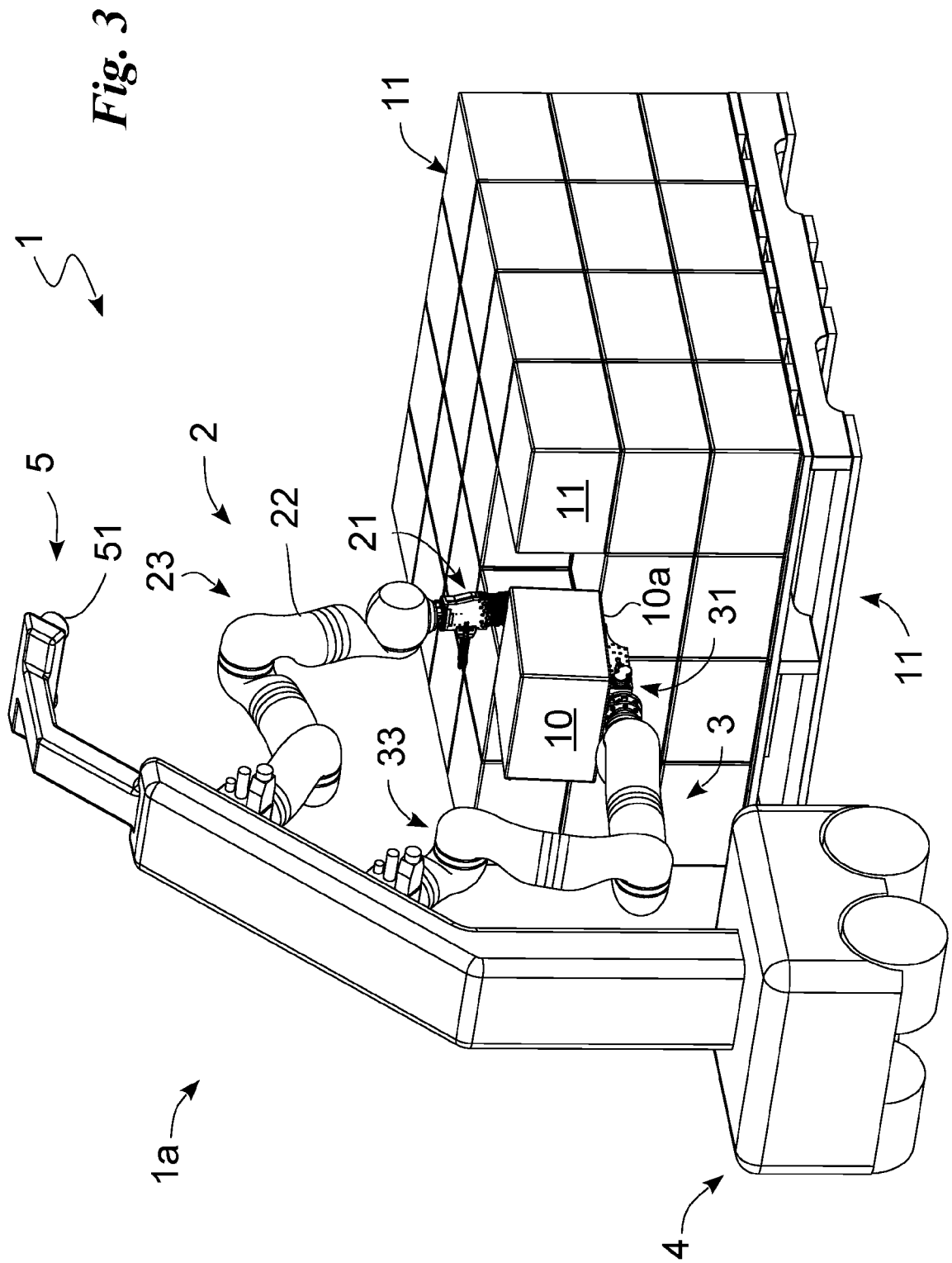

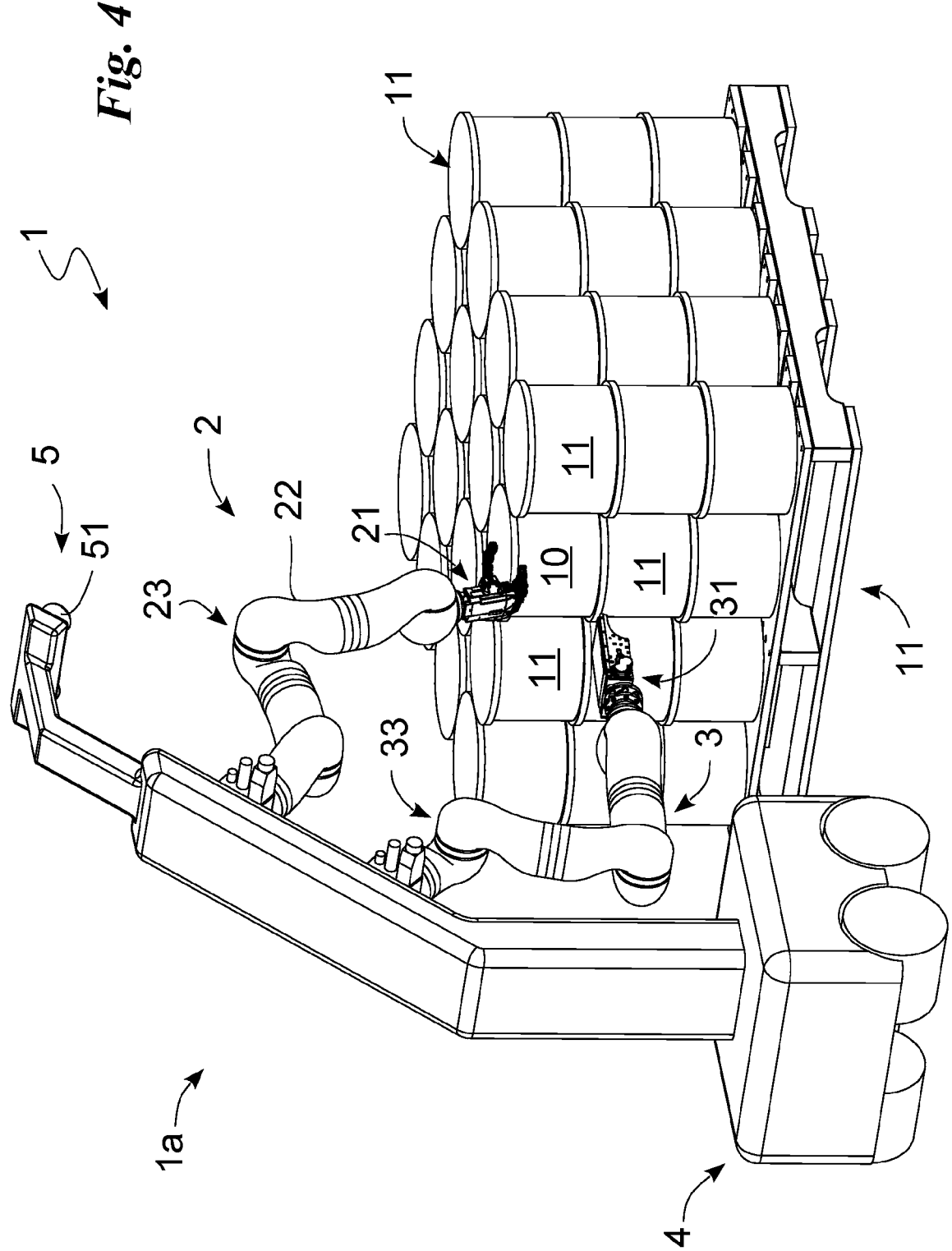

LOGISTIC DEVICE

This invention relates to a logistic device of the type specified in the preamble of the first claim.

In particular, it is designed to collect and then handle, preferably individually, packages placed on a pallet and/or inside a warehouse, e.g. on shelves.

As known today, depalletizing, i.e. collecting packages stacked on a pallet, is a very complex operation.

The automatic depalletizers on the market are usually equipped with a robotic arm that, by means of magnetism and/or depression, attaches itself to the top of a package so that it can be moved.

The described prior art comprises some significant drawbacks.

A first drawback is the fact that today's known devices can only collect a limited range of packages, especially packages of very simple shapes such as cubes, parallelepipeds, and cylinders.

This aspect is particularly inconvenient in supermarkets or other similar warehouses characterised by the need to move products of very different shapes, materials, sizes, or weights.

In particular, known devices cannot move irregularly shaped packages such as, for example, containers equipped with a lid.

This aspect is further accentuated by the fact that a pallet can have packages of different shapes and materials.

To date, these problems are largely unresolved and, therefore, the package handling operations and, in particular, depalletizing are performed almost exclusively manually.

In this context, the technical task underlying this invention is to devise a logistic device designed to basically overcome at least some of the above-mentioned drawbacks.

Within the sphere of said technical task, one important purpose of the invention is to provide a logistic device adept at moving packages of different shapes, weights, and materials.

Another important purpose of the invention is to provide a logistic device that can quickly and automatically perform any depalletizing.

The technical task and the specified purposes are achieved by means of a logistic device as claimed in the appended claim 1. Examples of preferred embodiments are described in the dependent claims.

The features and advantages of the invention are clarified by the following detailed description of preferred embodiments thereof, with reference to the accompanying drawings, wherein:

FIG. 3 shows, in scale, a logistic device according to the invention;

FIG. 4 shows, in scale, the device in FIG. 3 at a different time;

Figure 1:
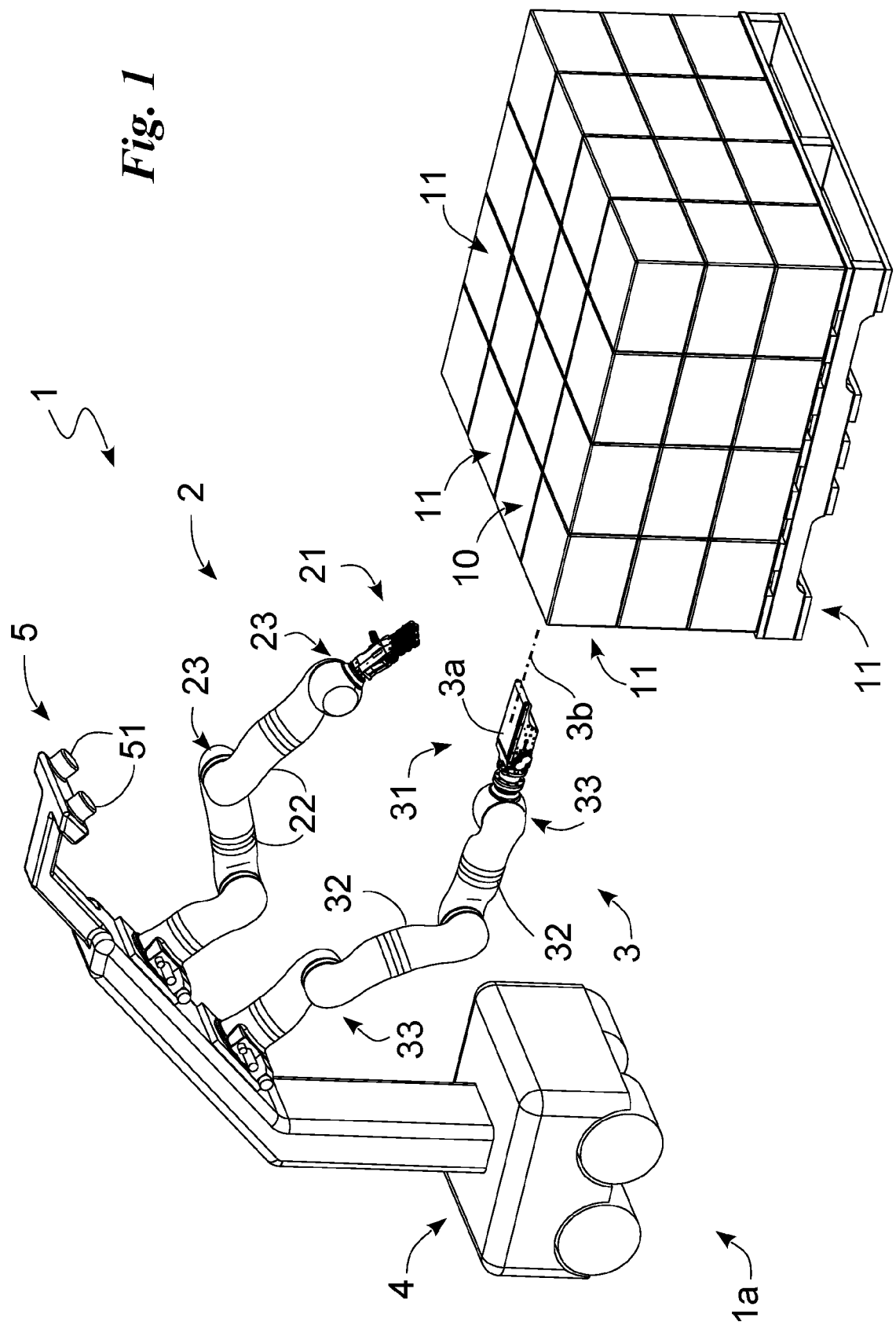
FIG. 1 shows, in scale, a logistic device according to the invention.

In this document, when measurements, values, shapes, and geometric references (such as perpendicularity and parallelism) are associated with words like "approximately" or other similar terms, such as "almost" or "substantially", they shall be understood as except for errors of measurement or imprecisions due to errors of production and/or manufacturing and, above all, except for a slight divergence from the value, measurement, shape, or geometric reference with which it is associated. For example, if associated with a value, such terms preferably indicate a divergence of no more than 10% of the value itself.

Furthermore, when used, terms, such as "first", "second", "higher", "lower", "main", and "secondary" do not necessarily identify an order, relationship priority, or relative position, but they can simply be used to distinguish different components more clearly from one another.

The measurements and data provided in this text are to be considered as performed in ICAO International Standard Atmosphere (ISO 2533), unless otherwise indicated. Unless otherwise specified, as is apparent from the following discussions, it is considered that terms such as "processing", "computer science", "determination", "calculation" or the like, refer to the computer action and/or processes or similar electronic computing devices that manipulate and/or transform data represented as physical, such as electronic quantities of registers of an information system and/or memory, other data similarly represented as physical quantities within computer systems, registers or other devices for storing, transmitting or displaying information. With reference to the figures, the number 1 indicates, as a whole, the logistic device according to the invention.

The logistic device 1 is designed to collect one or more packages from a group of packages, preferably only one at a time and without moving the other packages. The device can move the package from a collection position to a release position (the collection and release positions may coincide). The logistic device 1 is preferably designed to collect a package from a pallet.

For the sake of simplicity, in this document the package to be collected and moved is hereinafter identified by the expression "package to be collected 10", while the package/item not to be collected is identified by the expression "item not to be collected 11". The items not to be collected 11 are: the pallet and the packages placed on the same pallet, except for the package to be collected 10; a shelf and the packages placed on the same shelf except for the package to be collected 10. The package to be collected 10 defines a visible sector in relation to the items not to be collected 11, i.e. one or more surfaces not in contact with these items not to be collected 11 and, therefore, free and easily accessible by the device 1 for collecting it.

The logistic device 1 may comprise at least one manipulator 1a of the package to be collected 10.

The manipulator 1a may comprise a first robotic arm 2 comprising an adaptive gripper 21 at the package to be collected 10; and a second robotic arm 3 defining at least one resting surface 3a, suitably by gravity, for the package to be collected 10.

The resting surface 3a defines a longitudinal axis 3b.

The adaptive gripper 21 is designed to conform (specifically, to be counter-shaped) to the adhesion surface of the package to be collected 10, i.e. to the surface of the package 10 that the adaptive gripper 21 comes into contact with and acts upon. The first robotic arm 2 defines at least three degrees of freedom for the adaptive gripper 21 so as to change the position and spatial orientation of the gripper 21. The expression "change the position and orientation" refers to the fact that the first robotic arm 2 is capable of moving the gripper 21 by executing translations along one or more of the three main axes, rotations about each of said main axes or any combination of these movements. It should be specified that said main axes can include: one parallel to the gravitational gradient, one perpendicular to the gravitational gradient, and one perpendicular to the previous two.

The first robotic arm 2 may comprise one or more first rigid bodies 22, consisting of section bars, and one or more first mechanical joints 23 designed to move and, more precisely, rotate the first rigid bodies 22 relative to one another.

The handling of the first rigid bodies 22 can be performed according to indirect and/or direct kinematics.

The expression "indirect kinematics" defines a trajectory in the operating space, i.e. the calculation of the path of the adaptive gripper 21. Therefore, the position, speed, and acceleration of the first individual mechanical joints 23 can be determined so as to have said path of the adaptive gripper 21.

The term "direct kinematics" refers to the calculation of a trajectory in the joint space wherein the position, speed, and acceleration of the individual first joints 23 are determined, and not the path of the adaptive gripper 21. Consequently, the path of the adaptive gripper 21 is given by the position, speed, and acceleration of the first mechanical joints 23.

The first robotic arm 2 is designed to move the package to be collected 10 by defining a contact surface 10a on the package 10 for the resting surface 3a. In particular, it is designed to move the package to be collected 10 between a storage position wherein the contact surface 10a is obstructed (e.g. by contact with one or more items not to be collected 11) and a collection position wherein the contact surface 10a is free (e.g. removed/spaced apart from and therefore not in contact with items 11) enabling the resting surface 3a to access the contact surface 10a. The contact surface 10a is, preferably, the lowest surface (i.e. with the lowest gravitational potential energy) and, therefore, designed to rest by gravity on the resting surface 3a and/or items not to be collected 11.

Figure 2A:
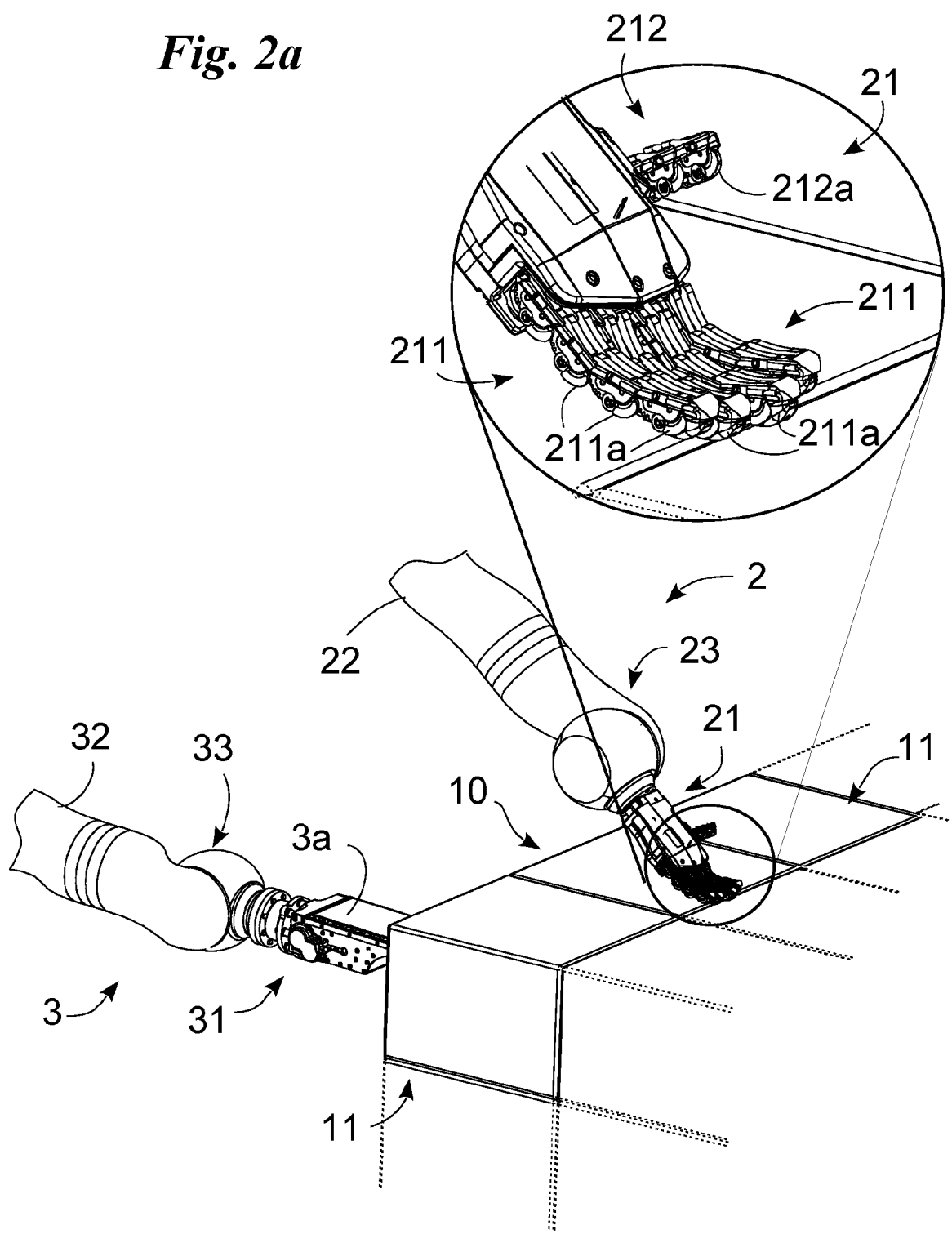
FIG. 2a-2c show an operation sequence of the logistic device according to the invention.
Figure 2B:
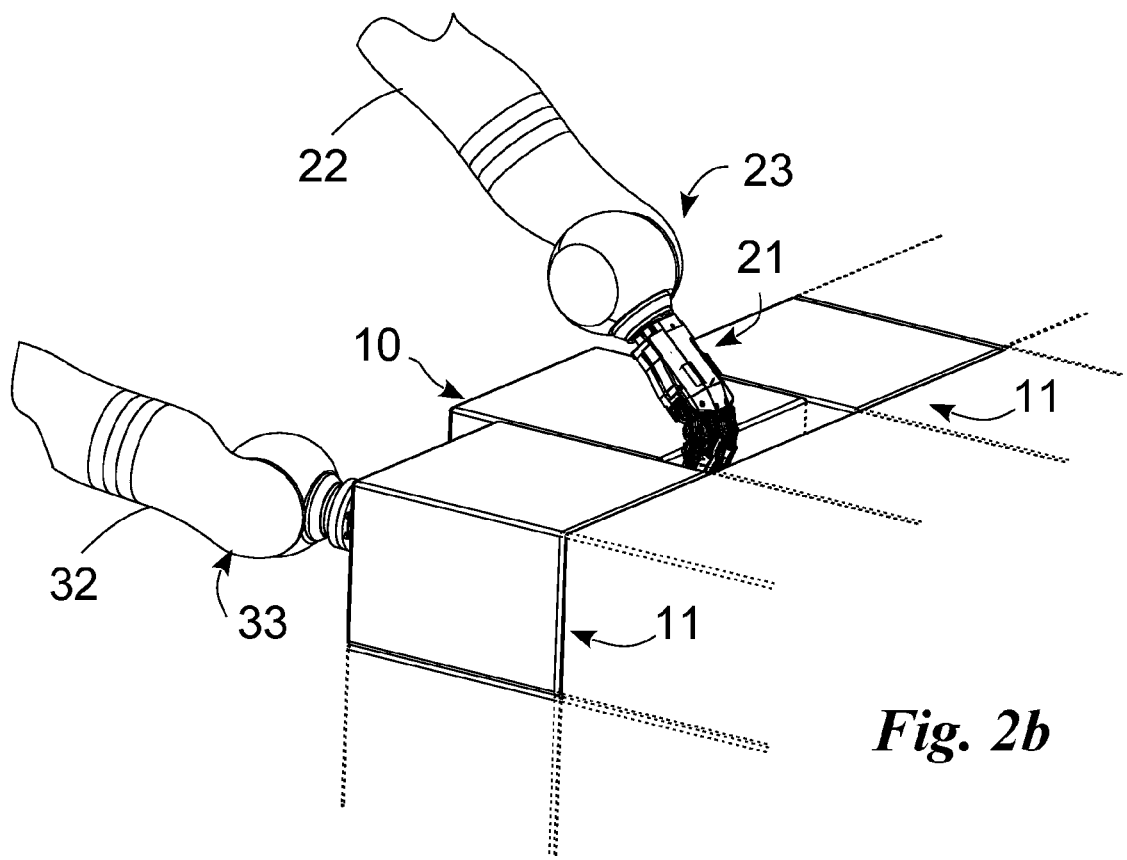
Figure 2C:
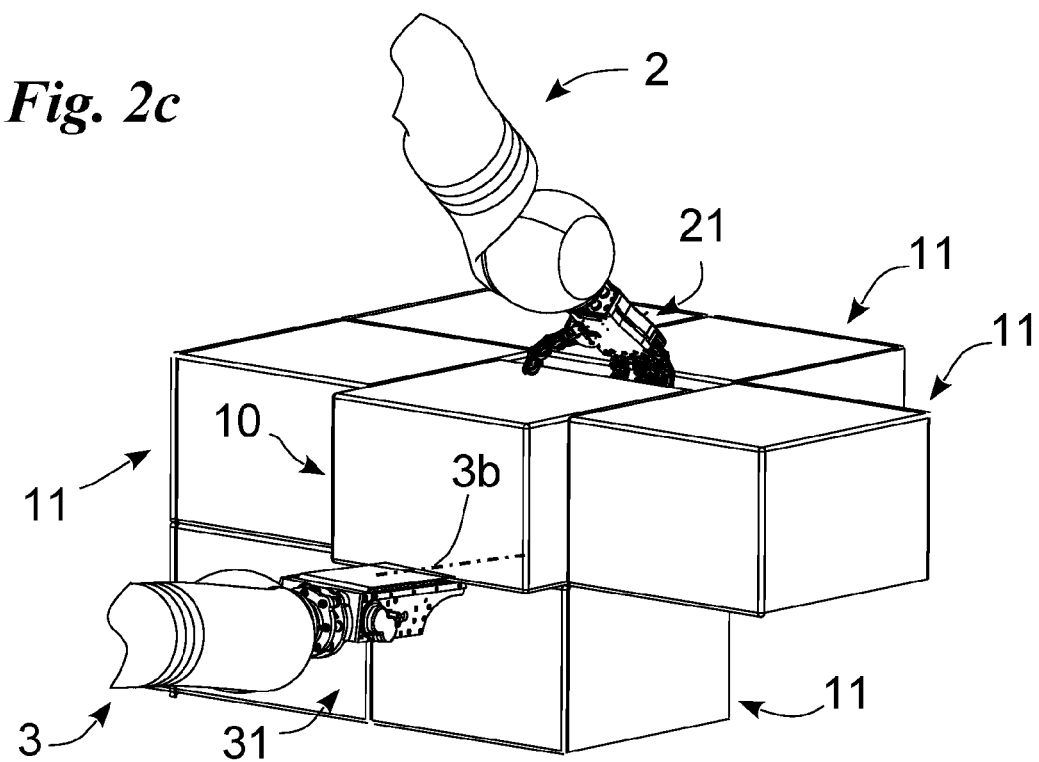
Figure 5A:
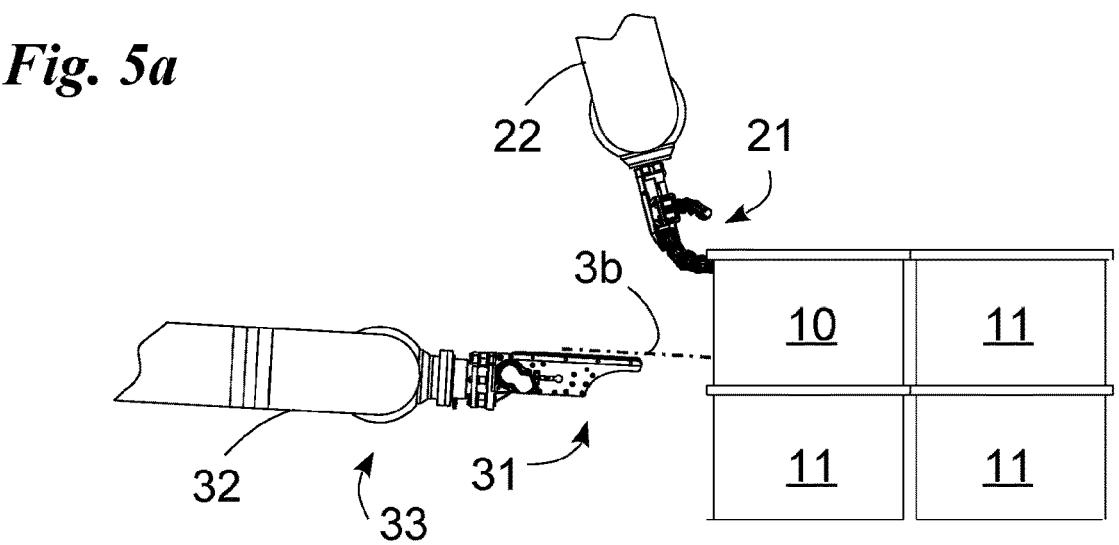
FIG. 5a-5c show an operation sequence of the device in FIGS. 3 and 4.
Figure 5B:
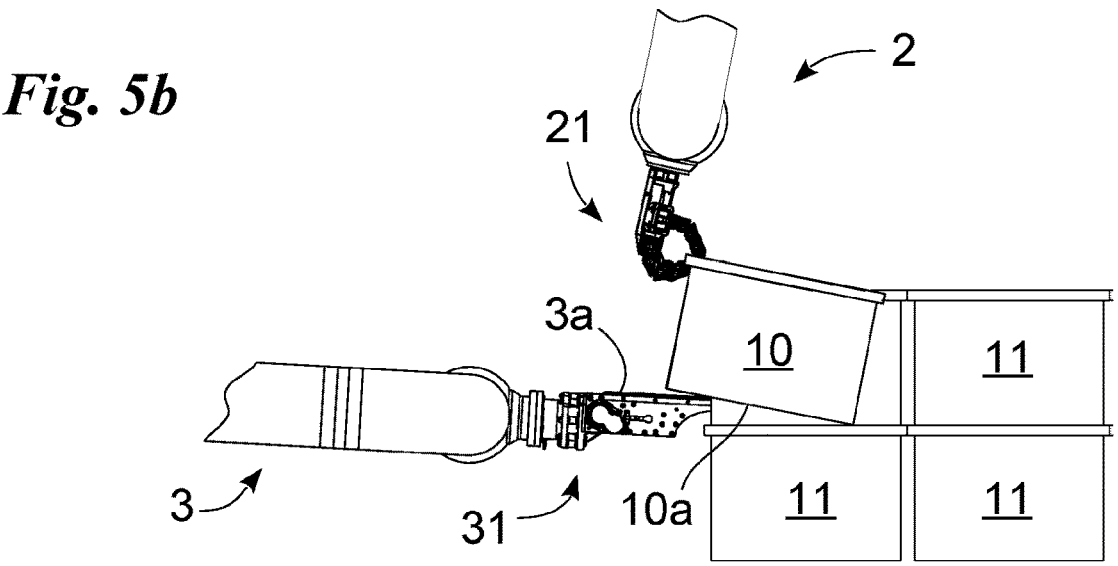
Figure 5C:
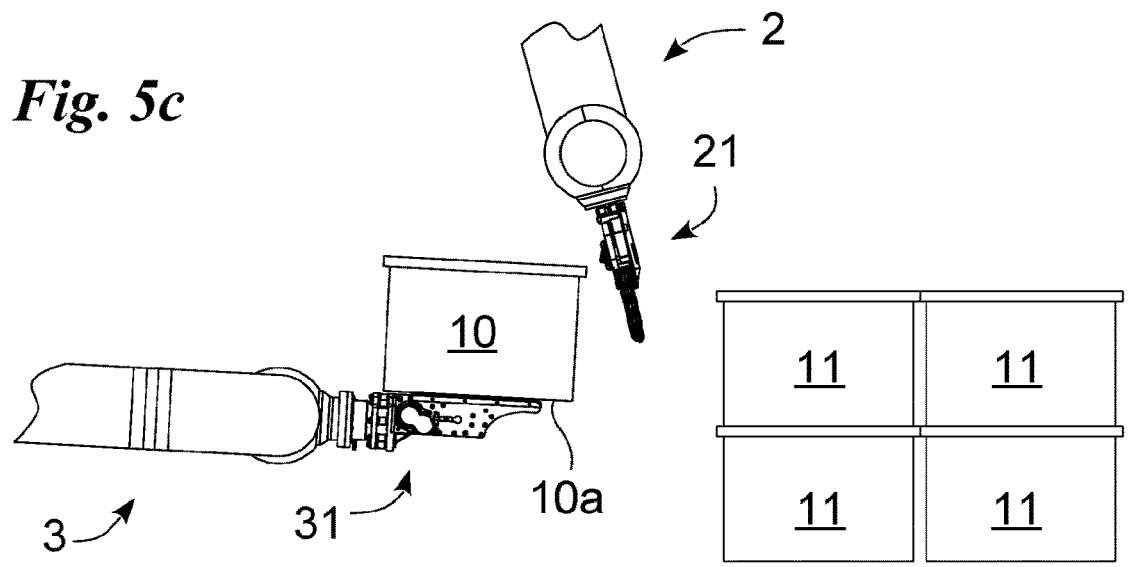

The first robotic arm 2 brings the package to be collected 10 into the collection position, e.g. by moving the package to be collected 10 until the contact surface 10a overhangs the items not to be collected 11 (FIGS. 2a and 2c). Alternatively, the first arm 2 determines the passage into the collection position by rotating the package to be collected 10 so as to at least partially raise it by spacing apart and/or removing the contact surface 10a from the items not to be collected 11 (FIGS. 5a and 5c).

If the arrangement of the package to be collected 10 does not enable the passage into the collection position, the first robotic arm 2 can use the adaptive gripper 21 so as to move the package to be collected 10 by changing the visible sector so as to have/generate a visible sector that can be used for the passage into the collection position.

The first arm 2 preferably moves the package to be collected 10 between the storage and collection positions by making the adaptive gripper 21 act on at least part of the visible sector of the package 10 and, in particular, by deforming the gripper 21 according to the visible sector, i.e. the adhesion surface between said adaptive gripper 21 and the package to be collected 10.

The adaptive gripper 21 can be under implemented and, specifically, single implemented.

It may comprise at least one finger 211 that can be rotated in relation to the first rigid body 22 adjacent to the adaptive gripper 21. The adaptive gripper 21 preferably comprises at least two fingers 211.

One finger 211 may comprise at least two phalanges 211a that can rotate relative to one another so as to make contact with and exert force on at least part of the visible sector of the package 10. Specifically, each finger 211 can be adaptive and, therefore, mobile so as to adapt to the profile of the package to be collected 10 and, specifically, to the visible sector maximising the extension of contact between finger 211 and package 10.

The adaptive gripper 21 may comprise at least one opposing finger 212, preferably only one, which is designed to work in opposition to the one or more fingers 211. The opposing finger 212 may comprise at least two additional phalanges 212a. The expression "working in opposition" identifies how the opposing finger 212 is designed to come into contact with the package to be collected 10 being moved in the opposite direction and, to be precise, being rotated in the opposite direction to that of the one or more fingers 211. In this way, a portion of the package 10 will be enclosed between the opposing finger 212 and one or more fingers 211.

The adaptive gripper 21 is, advantageously, an anthropomorphic hand (see FIG. 2a), suitably under implemented and, specifically, single implemented. More advantageously, it is an adaptive anthropomorphic hand.

An example of the finger 211 and/or 212 and, in particular, of the anthropomorphic hand is described in WO2017199127 from page 4, line 4, to page 18, line 5, and in FIGS. 10-6c. These parts of document WO2017199127 are included herein by way of reference. Another example is described in WO2017077429 from page 2, line 25, to page 22, line 9, and in FIGS. 10-4. These parts of document WO2017077429 are included herein by way of reference. In these examples, the opposing finger 212 consists of the thumb and the one or more fingers 211 of the remaining fingers.

The second robotic arm 3 comprises an end effector 31 defining at least one resting surface 3a.

The end effector 31 may comprise several resting surfaces 3a, specifically, two surfaces 3a.

The resting surfaces 3a may have longitudinal axes 3b parallel or tilted towards one another.

The surfaces 3a may have mutually tilted extension axes. They can be tilted and preferably face each other, defining a housing for the package to be collected 10, for example a V-shaped housing.

Alternatively, the resting surfaces 3a are parallel and, for example, lie on the same plane (are coplanar) or on separate planes.

The end effector 31 may comprise a body for reciprocally rotating the resting surfaces 3a designed to vary the tilt between the longitudinal axes 3b by, for example, modifying the housing defined by the surfaces 3a. The rotation axis is perpendicular to the longitudinal axes 3b and parallel or perpendicular to the surfaces 3a.

Alternatively or additionally, the end effector 31 may comprise a translator designed to move, suitably reciprocally, the resting surface 3a along, preferably, a translation axis that is perpendicular or parallel to the surface 3a and, more preferably, largely along the longitudinal axis 3b.

The end effector 31 may comprise, for each resting surface 3a, a conveyor belt 311 defining a resting surface 3a that can be moved along the longitudinal axis 3b.

The end effector 31 may comprise, for each resting surface 3a, at least one pressure sensor designed to detect when the package to be collected 10 rests on said surface 3a.

More specifically, it may comprise for each resting surface 3a several pressure sensors designed to identify the correct positioning of the package 10 on the resting surface 3a.

The pressure sensors are designed to identify whether the package 10 has a centre of gravity on the resting surface 3a and is, therefore, transportable without the risk of falling and without the help/cooperation of the first robotic arm 2 (FIG. 5c). For example, they can be spaced apart from each other and identify that the centre of gravity of the package to be collected 10 falls on the surface 3a if all the sensors detect the presence of the package and, specifically, basically detect the same pressure.

Alternatively, the end effector 31 can be similar to the adaptive gripper 21. It may thus comprise at least one additional finger (preferably at least two) comprising at least two additional phalanges and, appropriately, one additional opposing finger comprising at least two additional phalanges. To be precise, the end effector 31 can be an adaptive anthropomorphic hand suitably under implemented. See the adaptive gripper 21 above for more details.

The second robotic arm 3 defines at least three degrees of freedom for the end effector 31 so as to change the position and spatial orientation of said end effector 31.

It may comprise one or more second rigid bodies 32, consisting of section bars, and one or more second mechanical joints 33 designed to move and, more precisely, to rotate the second rigid bodies 32 relative to one another.

The handling of the second rigid bodies 32 can be performed in accordance with an indirect and/or direct kinematics.

The manipulator 1a can be moved and, therefore, comprise at least one trolley 4 designed to support the arms 2 and 3 and to move them in relation to at least the package to be collected 10.

Specifically, it may comprise a single trolley 4 for the arms 2 and 3 or, alternatively, a trolley 4 for the first arm 2 and a trolley 4 for the second arm 3 so as to move them independently of each other.

The at least one trolley 4 is, preferably, self-guided. It may be of a known type. The logistic device 1 may comprise an acquisition system 5.

The acquisition system 5 may be static and, therefore, attached to an external structure (for example, one or more walls). Alternatively, it is mobile and preferably attached to the at least one trolley 4 (preferably to a third trolley 4).

The acquisition system 5 is designed to acquire the position of one or more packages 10 and preferably 11.

This acquisition can be performed manually, for example, by an operator's entering data.

Alternatively or in addition, the acquisition can be automatic. For example, the acquisition system 5 can be optical and comprise at least one video camera 51 and, preferably, two video cameras 51 designed to shoot from different angles and therefore 3D. One or more video cameras 51 frame the package to be collected 10 and, preferably, the items not to be collected 11 and/or the manipulator 1a.

The acquisition system 5 is designed to identify the item to be collected 10 from among the package 10 and the acquired items 11. This identification can be manual, for example, by means of an operator's selecting the package 10 from a computerised list/reproduction of the acquired packages. Alternatively, it can be automatic according to, for example, a predefined collection sequence or by means of acquisition, for example optically, of an identifier placed on the package to be collected 10.

The acquisition system 5 is designed to identify the collection position of the package 10 and/or the visible sector and, suitably, the contact surface 10a. For example, the system 5 identifies, in a pallet, the position of the package to be collected 10 and of the items not to be collected 11 suitably in contact with the package 10. On the basis of this, it identifies the position of the package 10 in relation to the surrounding environment (i.e. the packages 11) and then defines the visible sector and, suitably, the contact surface 10a.

The release position can be identified automatically by the system 5 e.g. by markers and/or manually predefined by an operator via data input.

The acquisition system 5 is designed to identify the position of the manipulator 1a, in particular of the adaptive gripper 21 and of the end effector 31, making it possible to estimate their position and orientation in relation to the package to be collected 10.

The system 5 can define the position and orientation of the gripper 21 and of the end effector 31 by filming them with the at least one video camera 51. It should be highlighted how this operation can be assisted by the presence of optical markers on the adaptive gripper 21 and on the end effector 31. In some cases the position of the gripper 21 and of the end effector 31 can be derived from optical markers placed in the environment that are designed to be filmed by said at least one video camera 51 the position of which is known in relation to the manipulator 1a and/or to the package to be collected 10.

As an alternative or in addition, one manipulator 1a may comprise a tracking system (e.g. GPS) designed to enable the acquisition system 5 to identify its position.

The logistic device 1 may comprise a control unit of the at least one manipulator 1a. The control unit can be implemented in the manipulator 1a. Alternatively, it may consist of an external computer that can be data connected (e.g. wirelessly) with each manipulator 1a.

The unit is designed to command the movements of the robotic arms 2 and 3 according to the acquisition system 5 and, therefore, of the visible sector of the package to be collected 10, and, suitably, of the contact surface 10a. In particular, it is designed to command: the first arm 2 to move the package 10 from the storage position to the collection position; the second robotic arm 3 to place the resting surface 3a in contact with the contact surface 10a; and then at least the second arm 3 (suitably the second arm 3 only or both arms 2 and 3) to move the package 10. More specifically, the control unit is designed to command the first arm 2 to actuate the adaptive gripper 21 by bringing it into contact with the package 10, to deform the adaptive gripper 21 according to the adhesion surface of the package to be collected 10 to the gripper 21 and to move the package 10 from the storage position to the collection position.

The control unit preferably commands the first robotic arm 2 to bring the adaptive gripper 21 into contact with the visible sector and to deform the gripper 21 according to said visible sector so as to move the package 10 between the storage and collection positions acting on said visible sector.

It should be highlighted how, during the passage from the storage position to the collection position, the adaptive gripper 21 can modify the adhesion surface of the package to be collected 10 on which it acts and, therefore, additionally deform itself by adapting (counter-shaping) to the new adhesion surface of the package 10.

The control unit is designed to command the trolley 4 according to the acquisition system 5.

The control unit is designed to monitor the handling of the package to be collected 10. Specifically, it is designed to take advantage of the pressure sensor to detect both when the package 10 rests on the resting surface 3a and when the package to be collected 10 falls and, therefore, does not rest on the resting surface 3a any longer.

It should be highlighted how in this case the conveyor belt 311, suitably taking advantage of the pressure sensors, can move the package to be transported 10 bringing its centre of gravity to the resting surface 3a.

If the end effector 31 has V-shaped resting surfaces 3a, preferably with the mouth facing upwards, the package to be collected 10 is placed so as to rest on both the resting surfaces 3a and, suitably, so as to have the application axis of the centre of gravity force passing through the vertex of said V.

The invention comprises a new logistic method.

The logistic method is designed to be implemented by the logistic device 1 described above in structural terms.

The logistic method comprises the logistic device 1.

The logistic method may be automatic and, therefore, commanded and controlled by the control unit. This command may be executed in accordance with/depending on how much is contemporaneously acquired by the acquisition system 5 so as to avoid damage to the manipulator 1a or to a package 10 and/or the items 11.

The logistic method may comprise a step for identifying the package to be collected 10.

In this step, the acquisition system 5 acquires information on the package 10 and preferably items 11. For example, the acquisition system 5 acquires the package to be collected 10, a pallet (consisting of an item not to be collected 11) with the package 10 and the other items 11 placed on the pallet.

Once the package 10 and the items 11 are acquired, the acquisition system 5 identifies the package to be collected 10 and, preferably, its collection position.

The details of the acquisition and identification of the package 10 and of the items 11 are described above.

Once the identification step is complete, the logistic method may comprise a first handling step wherein the first arm 2 moves the package to be collected 10 from the storage position to the collection position; a resting step wherein the second arm 3 brings the resting surface 3a into contact with the contact surface 10a; and a second handling step wherein the at least second arm 3 handles the package 10.

In the first handling step, the adaptive gripper 21 moves into contact with the visible sector of the package 10 and, being adaptive, adapts itself to the profile of at least part of the visible sector of the package 10.

At this point, the first robotic arm 2 pushes and moves the package to be collected 10, placing the contact surface 10a so that it overhangs in relation to the items not to be collected 11 (collection position) (FIGS. 2a and 2c). Alternatively, the first arm 2 raises an edge of the package 10 that, then, rotates, raising and spacing apart the contact surface 10a from the items 11 (collection position) (FIGS. 5a-5c).

If the arrangement of the package 10 does not enable the passage into the collection position, the first robotic arm 2 can, before completing said passage, use the adaptive gripper 21 to change the visible sector of the package to be collected 10. At this point, the first handling step is concluded and there is the resting step.

In the resting step, the first arm 2 keeps the package 10 in the collection position while the second robotic arm 3 brings the resting surface 3a below the contact surface 10a and, thus, into contact with it.

At this point, the first robotic arm 2 can remove the adaptive gripper 21 from the package 10.

When the resting surface 3a is in contact with the contact surface 10a, the conveyor belt 311 can move the package to be collected 10 to better position the package itself on the resting surface 3a and, to be precise, to have its centre of gravity on the resting surface 3a.

The resting step is concluded when the control unit detects, thanks to the pressure sensor, that the contact surface 10a is resting on the resting surface 3a and, thus, the package 10 discharges the weight thereof onto the end effector 31.

The second handling step begins wherein the second robotic arm 3 (suitably only the second robotic arm 3) handles the package to be collected 10 until it reaches the release position. Therefore, in this case, the first robotic arm 2 can move a different package 10.

Alternatively, in this step both the robotic arms 2 and 3 contemporaneously move the package to be collected 10.

The release position can be identified automatically by the system 5 e.g. by markers and/or manually predefined by an operator via data input.

Once the release position has been reached, the logistic method may comprise a release step wherein the package 10 is replaced on the release position.

This operation may be performed individually or at the same time by the two arms 2 and 3.

For example, the adaptive gripper 21 pushes the package 10 away from the resting surface 3a. Alternatively, the end effector 31, for example, taking advantage of the belt 311, pushes the package to be collected 10 away from the resting surface 3a. Once the release step is concluded, the method is concluded.

At this point, the manipulator 1a may stop or begin a new logistic method.

The logistic device 1 and method, according to the invention, achieve some important advantages.

A first advantage is the fact that the logistic device 1 and method move a package 10 in a completely automatic way without the intervention of personnel, meaning it is possible to avoid an operator's needing to move heavy loads and subjecting him or herself to dangerous efforts.

One advantage is in the adoption of a gripper 21 of the adaptive type and, from the particular activation of the robots 2 and 3, which make it possible to move packages of any shape, size, weight, and material.

Another advantage is the high flexibility of the logistic device 1 and of the logistic method that make it possible to move, without distinction, packages of any type. This advantage compared to the known devices is particularly clear in supermarkets or other similar warehouses where, in contrast to the devices known up until today, the logistic device 1 can vary shape, material, size, and weight of the package to be moved without problems.

In particular, the known devices are incapable of moving packages of irregular shapes such as, for example, containers equipped with lids.

Variations may be made to the invention that fall within the scope of the inventive concept defined in the claims. In this context, all details may be replaced with equivalent elements and the materials, shapes, and dimensions may be of any kind.

The invention claimed is:

1. A logistic device for handling a package to be collected among items not to be collected; said package to be collected defining a contact surface with said items not to be collected; said logistic device comprising:
    a first robotic arm comprising an adaptive gripper that adapts to said package to be collected and defining at least three degrees of freedom for said adaptive gripper, so as to modify the position and spatial orientation of said adaptive gripper;
    a second robotic arm comprising an end effector defining at least one resting surface for said package to be collected and defining at least three degrees of freedom for said end effector, so as to modify the position and spatial orientation of said end effector;

a control unit designed to command said first robotic arm to bring said adaptive gripper into contact with said package to be collected, deform said adaptive gripper according to the adhesion surface between said package to be collected and said adaptive gripper, move said package to be collected from a storage position in which said contact surface is in contact with items not to be collected and a collection position in which said contact surface is not in contact with items not to be collected;

said second robotic arm to bring said resting surface of said end effector into contact with said contact surface; and then at least said second robotic arm to move said package to be collected.

2. The logistic device according to claim 1, wherein said contact surface is the surface with the lowest gravitational potential energy; and wherein said control unit commands said second robotic arm to bring said resting surface into contact with said contact surface, so that said second robotic arm supports the weight of said item to be collected.

3. The logistic device according to claim 2, wherein said end effector comprises at least one pressure sensor designed to detect when said package to be collected rests on said resting surface and a conveyor belt designed to move said resting surface and then said package to be collected resting on said resting surface so as to arrange the centre of gravity of said package to be collected on said resting surface.

4. The logistic device according to claim 1, wherein said end effector comprises two of said at least one resting surface inclined and facing each other by defining a V-shaped housing for said package to be collected.

5. The logistic device according to claim 1, wherein said adaptive gripper comprises at least one finger comprising at least two phalanges which are rotatable relative to one another.

6. The logistic device according to claim 5, wherein said adaptive gripper comprises at least two of said at least one finger.

7. The logistic device according to claim 4, wherein said adaptive gripper comprises at least one opposing finger adapted to work in opposition to said at least one finger.

8. The logistic device according to claim 7, wherein said adaptive gripper is an adaptive anthropomorphic hand.

9. The logistic device according to claim 1, wherein said package to be collected defines at least one visible sector in relation to said items not to be collected; wherein said logistic device comprises an acquisition system for acquiring at least part of said visible sector of said package to be collected; and wherein said control unit commands said first robotic arm to bring said adaptive gripper into contact with said visible sector and deform said adaptive gripper according to said visible sector, so as to move said package to be collected between said storage position and said collection position by acting on said visible sector.

10. The logistic device according to the claim 9, wherein said acquisition system comprises two video cameras designed to film said package to be collected from different angles.

11. The logistic device according to claim 1, comprising a movement device designed to support and move said robotic arms.

12. A logistic method for using said logistic device according to claim 1, said method comprising:

a first handling step wherein said first robotic arm brings said adaptive gripper into contact with said package to be collected, deforms said adaptive gripper according to the adhesion surface between said package to be collected and said adaptive gripper, moves said package to be collected from a storage position wherein said contact surface is in contact with said items not to be collected and a collection position wherein said contact surface is not in contact with said items not to be collected;

a resting step wherein said second robotic arm brings said resting surface into contact with said contact surface; and a second handling step wherein at least said second robotic arm moves said package to be collected.

13. The logistic method according to claim 12, wherein in said second handling step said second robotic arm exclusively moves said package to be collected.

14. The logistic method according to claim 12, wherein said second robotic arm comprising an end effector defining at least one resting surface; and in said second handling step said end effector moves said resting surface and then the package to be collected resting on said resting surface so as to arrange the centre of gravity of said package to be collected on said resting surface.

* * * * *